(12) United States Patent
Le et al.

(10) Patent No.: US 7,809,929 B2
(45) Date of Patent: Oct. 5, 2010

(54) UNIVERSAL REGISTER RENAME MECHANISM FOR INSTRUCTIONS WITH MULTIPLE TARGETS IN A MICROPROCESSOR

(75) Inventors: Hung Q. Le, Austin, TX (US); Dung Q. Nguyen, Austin, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 11/736,855

(22) Filed: Apr. 18, 2007

(65) Prior Publication Data

US 2008/0263331 A1  Oct. 23, 2008

(51) Int. Cl.
*G06F 9/30* (2006.01)
(52) U.S. Cl. .......................... 712/216; 712/217; 712/32; 712/214
(58) Field of Classification Search ............... 712/32, 712/216, 217, 214
See application file for complete search history.

(56) References Cited

U.S. PATENT DOCUMENTS

| | | | |
|---|---|---|---|
| 5,524,262 A * | 6/1996 | Colwell et al. | 712/23 |
| 5,826,070 A * | 10/1998 | Olson et al. | 712/222 |
| 5,961,636 A * | 10/1999 | Brooks et al. | 712/228 |
| 5,974,525 A * | 10/1999 | Lin et al. | 712/23 |
| 6,047,369 A * | 4/2000 | Colwell et al. | 712/217 |
| 6,240,507 B1 * | 5/2001 | Derrick et al. | 712/217 |
| 6,311,267 B1 * | 10/2001 | Nguyen et al. | 712/217 |
| 6,393,546 B1 * | 5/2002 | Witt et al. | 712/36 |
| 6,625,746 B1 * | 9/2003 | Moore | 714/6 |
| 2004/0015904 A1 * | 1/2004 | Jourdan et al. | 717/141 |
| 2004/0215936 A1 * | 10/2004 | Ambekar et al. | 712/217 |
| 2006/0265555 A1 * | 11/2006 | Davis et al. | 711/147 |
| 2008/0016324 A1 * | 1/2008 | Burky et al. | 712/217 |

OTHER PUBLICATIONS

U.S. Appl. No. 11/736,844 filed Apr. 18, 2007, Le et al.
USPTO U.S. Appl. No. 11/736,844, Image File Wrapper printed from PAIR on Apr. 8, 2010, 2 pages.

* cited by examiner

*Primary Examiner*—Eddie P Chan
*Assistant Examiner*—Idriss N Alrobaye
(74) *Attorney, Agent, or Firm*—Stephen R. Tkacs; Stephen J. Walder, Jr.; Diana R. Gerhardt (57) ABSTRACT

A universal register rename mechanism for instructions with multiple targets using a common destination tag. For each instruction that updates multiple destinations, a single rename entry is allocated to handle all destinations associated with it. A rename entry now consists of a DTAG and a vector to indicate the type of destination(s) that is/are being updated by such a particular instruction. For example, a common DTAG can be assigned to a fixed point unit instruction (FXU) that updates general purpose register (GPR), fixed point exception register (XER), and condition code register (CR) destinations. During flush time, the DTAGs in the recovery link may be used to restore the information indicating that the youngest instruction updates a particular architected register. By using a single, universal rename structure for all types of destinations, a large saving in silicon and power can be realized without the need to sacrifice performance.

10 Claims, 10 Drawing Sheets

*FIG. 10*

UNIVERSAL REGISTER RENAME MECHANISM FOR INSTRUCTIONS WITH MULTIPLE TARGETS IN A MICROPROCESSOR

BACKGROUND

1. Technical Field

The present application relates generally to an improved data processing system and method. More specifically, the present application is directed to a universal register rename mechanism for instructions with multiple targets in a microprocessor.

2. Description of Related Art

Register renaming is a common technique in microprocessor design used to increase performance by allowing instructions to execute out of order. Programs are composed of instructions that operate on values. The instructions must name these values in order to distinguish them from one another. A typical instruction might say, for example, add X and Y and put the result in Z. In this instruction, X, Y, and Z are the names of storage locations. In order to have a compact instruction encoding, most processor instruction sets have a small set of special locations that can be directly named. In smaller processors, the names of these locations correspond directly to elements of a register file.

Different instructions take different amounts of time. For instance, a processor may be able to execute hundreds of instructions while a single load from main memory is in process. Shorter instructions executed while the load is outstanding will finish first; therefore, the instructions are finishing out of the original program order. Out of order execution has been used in most recent high-performance CPUs to achieve some of their speed gains.

Consider this piece of code running on an out-of-order CPU:

1. Load register 1 from memory location 1024
2. Add the number 2 to register 1
3. Store register 1 to memory location 1032
4. Load register 1 from memory location 2048
5. Add the number 4 to register 1
6. Store register 1 to memory location 2056

Instructions 4, 5, and 6 are independent of instructions 1, 2, and 3, but the processor cannot finish 4 until 3 is done, because 3 would then write the wrong value.

Register renaming can eliminate this restriction by changing the names of some of the registers:

1. Load register 1 from memory location 1024
2. Add the number 2 to register 1
3. Store register 1 to memory location 1032
4. Load register 2 from memory location 2048
5. Add the number 4 to register 2
6. Store register 2 to memory location 2056

Now instructions 4, 5, and 6 can be executed in parallel with instructions 1, 2, and 3, so that the program can execute faster.

When possible, the compiler performs this renaming. The compiler is constrained in many ways, primarily by the finite number of register names in the instruction set. Many high performance microprocessors rename registers in hardware to expose additional parallelism.

Typically, a different rename structure is required for each destination type in the microprocessor. For example, the general purpose register (GPR) fixed point destination will require a rename structure that is different from floating point register (FPR) destinations. All these rename structures and logic are usually very complicated and costly in terms of power and silicon.

SUMMARY

In one illustrative embodiment, a method for universal register renaming comprises allocating a destination tag for an instruction being issued in a microprocessor, setting a first destination type and a second destination type for the instruction in a logical register array in the microprocessor, asserting a first rename buffer bit if a result of the instruction is written to a rename buffer corresponding to the first destination type, and asserting a second rename buffer bit if a result of the instruction is written to a rename buffer corresponding to the second destination type.

In another exemplary embodiment, the method further comprises in an issue queue, determining whether an issuing instruction depends on a younger instruction. The method further comprises if the issuing instruction does not depend on a younger instruction, asserting a first architected register bit corresponding to the first destination type or a second architected register bit corresponding to the first destination type in the issue queue for the issuing instruction in the issue queue for the issuing instruction. The method further comprises if the issuing instruction depends on a younger instruction, de-asserting the first architected register bit or the second architected register bit in the issue queue for the issuing instruction.

In a further exemplary embodiment, the method further comprises for an issuing instruction with the first rename buffer bit asserted or the second rename buffer bit asserted, sending a logical register target, one or more dispatching source register addresses, a dispatching destination tag, a first source destination tag corresponding to the first destination type, a first rename buffer bit corresponding to the first destination type, a second source destination tag corresponding to the second destination type, and a second rename buffer bit corresponding to the second destination type for the issuing instruction to a corresponding execution unit.

In yet another exemplary embodiment, the method further comprises writing a result of execution into a rename buffer corresponding to the first destination type or a rename buffer corresponding to the second destination type of the executing instruction using the execution destination tag as a write address. In a still further exemplary embodiment, the method further comprises at completion time, sending completing destination tag for a completing instruction to the issue queue and the rename stage.

In another, further exemplary embodiment, the method further comprises using the completing destination tag to read out completing register target fields and destination type bits from the logical register array, using the completing destination tag to read out a result from a rename buffer corresponding to the first destination type or a rename buffer corresponding to the second destination type of the completing instruction, and writing the result to an architected register corresponding to the first destination type or an architected register corresponding to the second destination type of the completing instruction.

In another illustrative embodiment, a microprocessor with universal register renaming comprises an issue queue, a rename mechanism, a plurality of execution units, and completion logic. The issue queue issues instructions to the plurality of execution units. The plurality of execution units send information for executing instructions to the issue queue and the rename mechanism. The completion logic sends information for completed instructions to the issue queue and the rename mechanism. The rename mechanism allocates a destination tag for an instruction being issued in a microprocessor, sets a first destination type and a second destination type for the instruction in a logical register array in the microprocessor, asserts a first rename buffer bit if a result of the instruction is written to a rename buffer corresponding to the first destination type, and asserts a second rename buffer bit if a result of the instruction is written to a rename buffer corresponding to the second destination type.

In another exemplary embodiment, the issue queue determines whether an issuing instruction depends on a younger instruction. If the issuing instruction does not depend on a younger instruction, the issue queue asserts a first architected register bit corresponding to the first destination type or a second architected register bit corresponding to the first destination type in the issue queue for the issuing instruction. If the issuing instruction depends on a younger instruction, the issue queue de-asserts the first architected register bit or the second architected register bit in the issue queue for the issuing instruction.

In a further exemplary embodiment, for an issuing instruction with the first rename buffer bit asserted or the second rename buffer bit asserted, the issue queue sends a logical register target, one or more dispatching source register addresses, a dispatching destination tag, a first source destination tag corresponding to the first destination type, a first rename buffer bit corresponding to the first destination type, a second source destination tag corresponding to the second destination type, and a second rename buffer bit corresponding to the second destination type for the issuing instruction to a corresponding execution unit.

In a further exemplary embodiment, at completion time, the completion logic sends a completing destination tag for a completing instruction to the issue queue and the rename mechanism. In a still further exemplary embodiment, the rename mechanism uses the completing destination tag to read out completing register target fields, the first rename buffer bit, and the second rename buffer bit from the logical register array, uses the completing destination tag to read out a result from a rename buffer corresponding to the first destination type or a rename buffer corresponding to the second destination type of the completing instruction, and writes the result to an architected register corresponding to the first destination type or an architected register corresponding to the second destination type of the completing instruction.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figures 1, 2:
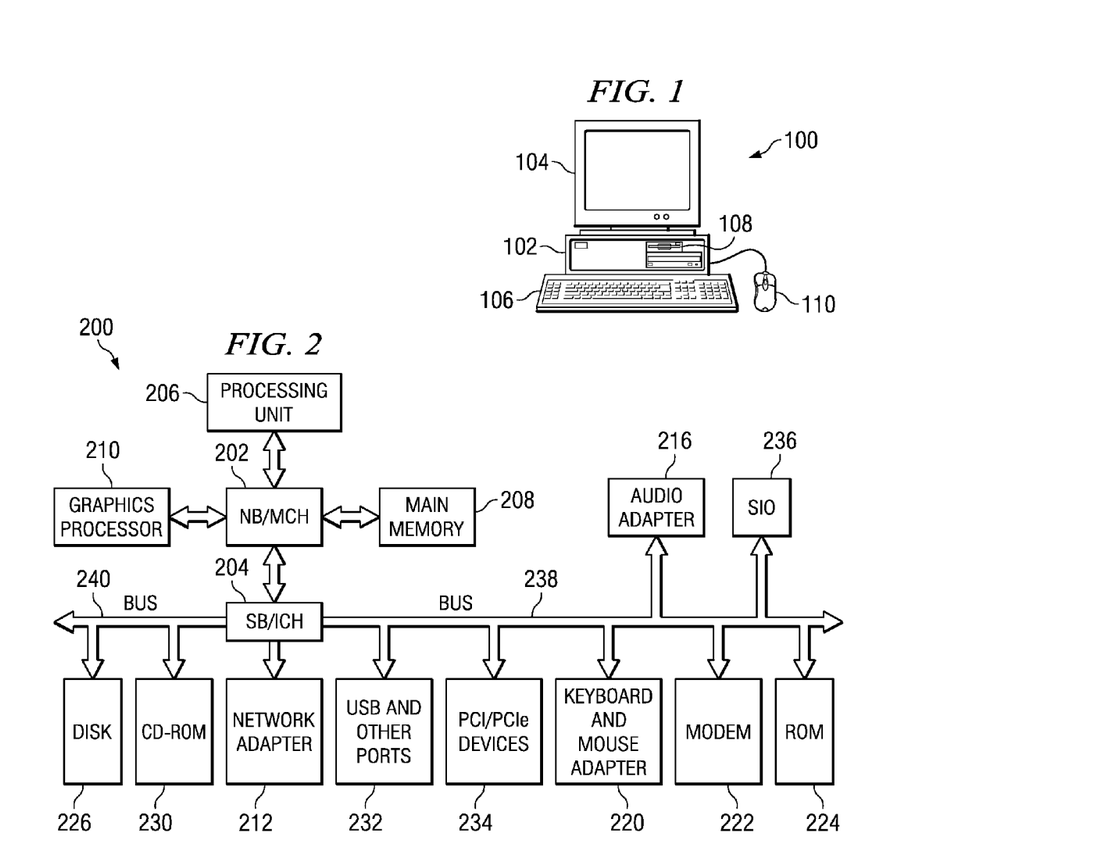
FIG. 1 is a pictorial representation of a data processing system in which the present invention may be implemented in accordance with the illustrative embodiments.
FIG. 2 is a block diagram of an exemplary data processing system in which aspects of the illustrative embodiments may be implemented.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to FIG. 1, a pictorial representation of a data processing system in which the present invention may be implemented is depicted in accordance with the illustrative embodiments. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

With reference now to FIG. 2, a block diagram of an exemplary data processing system is shown in which aspects of the illustrative embodiments may be implemented. Data processing system 200 is an example of a computer, such as computer 100 in FIG. 1, in which exemplary aspects of the illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIG. 1-2 may vary depending on the implementation. Other internal hardware or peripheral devices, such as flash memory, equivalent non-volatile memory, or optical disk drives and the like, may be used in addition to or in place of the hardware depicted in FIG. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

In an illustrative embodiment, processing unit 206 may be a microprocessor with a universal register rename mechanism for instructions with multiple targets using a common destination tag (DTAG). For each instruction that updates multiple destinations, a single rename entry is allocated to handle all destinations associated with it. A rename entry now consists of a DTAG and a vector to indicate the type of destination(s) that is/are being updated by such a particular instruction. For example, a common DTAG can be assigned to a fixed point unit (FXU) instruction that updates general purpose register (GPR), fixed point exception register (XER), and condition code register (CR) destinations. In other words, one DTAG may be assigned to all three types of destinations. During flush time, the DTAGs in the recovery link may be used to restore the information indicating that the youngest instruction updates a particular architected register. By using a single, universal rename structure for all types of destinations, a large saving in silicon and power can be realized without the need to sacrifice performance.

Figure 3:
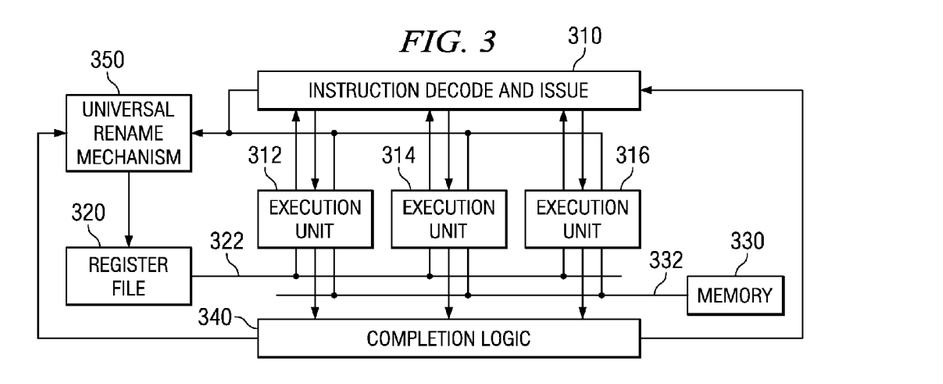
FIG. 3 is a block diagram illustrating parts of a microprocessor having a universal register rename mechanism in accordance with an illustrative embodiment.

FIG. 3 is a block diagram illustrating parts of a microprocessor having a universal register rename mechanism in accordance with an illustrative embodiment. The microprocessor may be, for example, processing unit 206 in FIG. 2. The microprocessor includes instruction decode and issue logic 310, which receives instructions, decodes the instructions, and issues the instructions to execution units 312, 314, 316. In one exemplary embodiment, execution units 312, 314, 316 may execute different instruction types. For example, execution unit 312 may execute fixed point instructions, execution unit 314 may execute floating point instructions, and execution unit 316 may execute vector multimedia extension (VMX) instructions. Universal rename mechanism 350 renames destinations of different instruction types using a single rename structure. Universal rename mechanism 350 may rename multiple destination types with a single instruction.

Bus 322 connects execution units 312-316 to register file 320. Bus 332 connects execution units 312-316 to memory 330. Memory 330 may be a read only memory (ROM) that is internal to the processor, such as a cache memory. Alternatively, memory 330 may be external to the processor, such as system memory. While FIG. 3 shows shared buses 322, 332 connecting execution units 312-316 to register file 320 and memory 330, it will be appreciated that in an alternative embodiment each execution unit may have its own independent connections to register file 320 and memory 330.

Execution units 312-316 connect to instruction decode and issue logic 310 and universal rename mechanism 350. When execution units 312-316 finish execution of an instruction, they may send information back to the instruction decode and issue logic 310 and universal rename mechanism 350 to update information, as described in further detail below. Completion logic 340 handles completion of instruction execution, such as flushing instructions. Completion logic 340 connects to instruction decode and issue logic 310 and universal rename mechanism 350. At completion time, completion logic 340 may send information back to instruction decode and issue logic 310 and universal rename mechanism 350 to update information, as described in further detail below.

Figure 4:
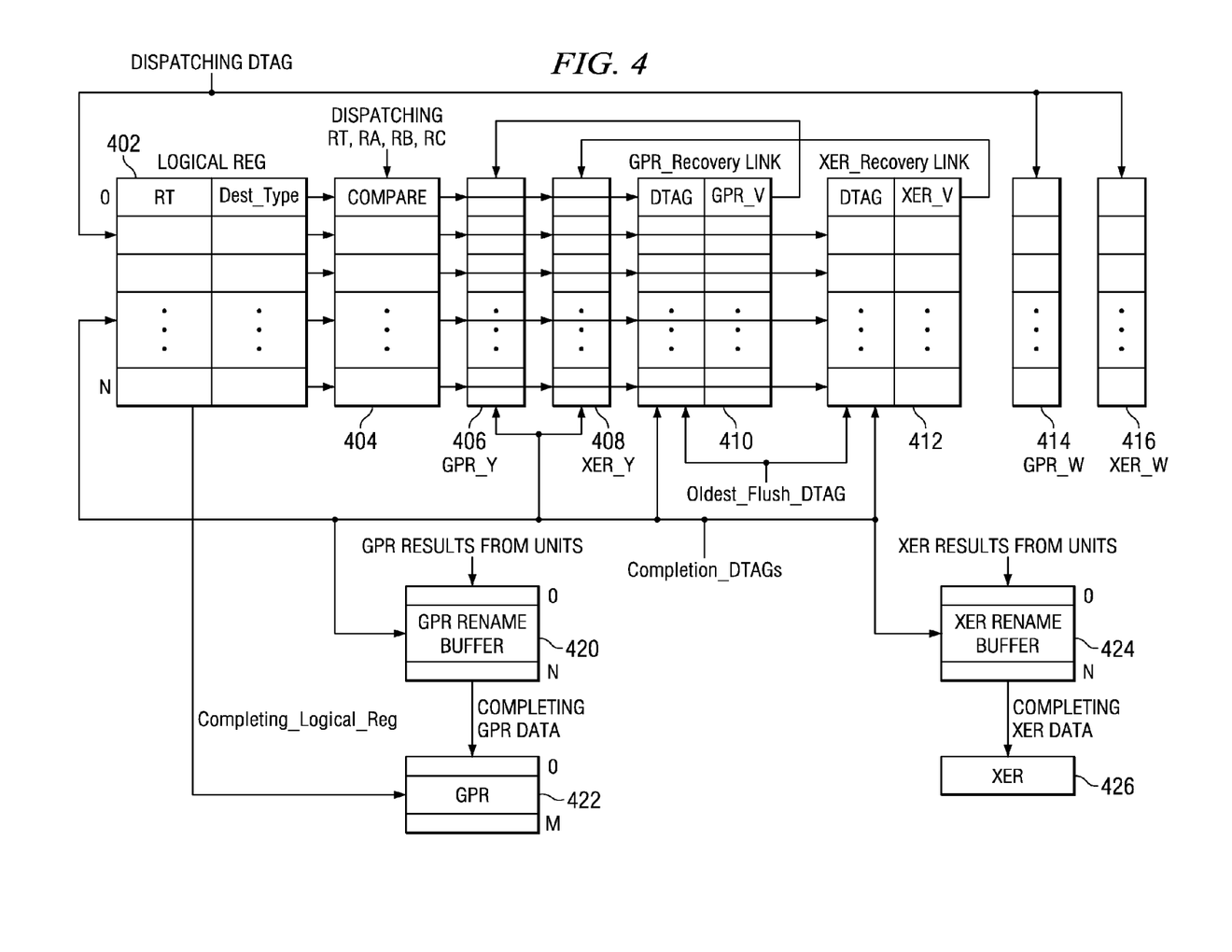
FIG. 4 depicts a dataflow of the register renaming mechanism in accordance with an illustrative embodiment.

FIG. 4 depicts a dataflow of the register renaming mechanism in accordance with an illustrative embodiment. Fixed point unit (FXU) instructions can update the general purpose register (GPR). Floating point unit (FPU) instructions can update the floating point register (FPR). And, vector multimedia extension (VMX) instructions can update the VMX register. In an illustrative embodiment, a FXU instruction may update multiple destinations, such as a general purpose register (GPR) and a fixed point exception register (XER). The illustrative embodiment may also be applied to other destinations, such as a condition code register (CR), Link, Count, etc. The illustrative embodiment may also be applied to other instruction types, such as FPU updating floating point register (FPR) and floating point status and control register (FPSCR). However, for simplicity, the register renaming mechanism is shown for a FXU instruction updating GPR and/or XER destination types.

A destination tag (DTAG) is allocated at dispatch time for each instruction to indicate which physical register the instruction can write its result to. DTAG is the renamed register of a particular logical register (LR) 402. The DTAG is allocated sequentially at dispatch time, and is de-allocated at completion time. The logical register (LR) 402 is the architected destination register, or register target (RT), of the instruction. The LR is used as a write address into a register file to write its result at completion time.

Each entry in logical register array 402 includes a Destination_type field with one bit for each destination type. For example, for a FXU instruction in the illustrative embodiment, there will be one bit to indicate that the instruction updates a GPR register and one bit to indicate that the instruction updates a XER register.

A Y bit indicates which DTAG is the youngest instruction to update a particular destination register (RT). When there are multiple instructions needed to update the same RT field, only the youngest instruction is allowed to have this bit asserted to 1 (one). When the GPR_Y bit 406 is asserted, any younger dependent instructions that update the GPR register will wait for this particular DTAG and ignore all other instructions with GPR_Y bit 406 de-asserted. When the XER_Y bit 408 is asserted, any younger dependent instructions that update the XER register will wait for this particular DTAG and ignore all other instructions with XER_Y bit 408 de-asserted. There will be one GPR_Y bit 406 and one XER_Y bit 408 for each DTAG location.

The W bit indicates that the RT is renamed to a particular DTAG. If GPR_W bit 414 is de-asserted and GPR_Y bit 406 is asserted, the result is not yet written into GPR 422. If GPR_W=1, the result is already written into the GPR rename buffer 420. If XER_W bit 416 is de-asserted and XER_Y bit 408 is asserted, the result is not yet written into the XER rename buffer 424. If XER_W=1, the result is already written into the XER rename buffer 424.

The recovery link arrays contain the DTAG and a V bit for the previous instruction that updates the same RT as the dispatching instruction. GPR_recovery link 410 is used for recovering the GPR_Y bit to the previous un-flushed DTAG that is updating the same GPR RT location as the flushed instruction. The GPR_V bit indicates that an entry in GPR_recovery link 410 is valid, i.e. the DTAG in this entry is still in the renamed state. XER_recovery link 412 is used for recovering the XER_Y bit to the previous un-flushed DTAG that is updating the same XER RT location as the flushed instruction. The XER_V bit indicates that an entry in XER_recovery link 412 is valid, i.e. the DTAG in this entry is still in the renamed state.

GPR rename buffer 420 and XER rename buffer 424 form a set of registers to hold temporary results before they can be committed into the architected facility upon completion of the instruction. For GPR and XER, there is usually one rename buffer entry per DTAG (0 to N). There may be more or fewer entries in GPR 422 (0 to M), and there may be one entry in XER 426.

Compare logic 404 compares DTAGs to determine whether a newly dispatched DTAG is a younger instruction of a particular type to update the Y bit, whether an executed instruction matches with a source DTAG to update the W bit, or whether a completed instruction matches a source DTAG to update the A bit, as will be described in further detail below.

In the depicted example, the instruction types are fixed point instruction (FXU), floating point instruction (FPU), and vector multimedia extension (VMX) instruction. The register types are general purpose register (GPR) and fixed point exception register (XER). However, a person of ordinary skill in the art will appreciate that the instruction types and register types may vary depending upon the implementation. In addition, the universal rename mechanism may handle more or fewer instruction types or register types. Other modifications may be made within the spirit and scope of the present invention.

In the issue queue (not shown), an A bit indicates that the result is in the architected register if A=1. If A=0, then the result is in the renamed state. There will be one GPR_A bit and one XER_A bit for each DTAG location in the issue queue.

For initial rename states, RT fields in logical register array 402 are set to 0, all Y bits 406 and 408 are set to 0, all W bits 414 and 416 are set to 0, and the V bits in the recovery link arrays 410 and 412 are set to 0. The rename structure may be managed by a DTAG head pointer (not shown) and a DTAG tail pointer (not shown). The DTAG head pointer points to the next free DTAG to be allocated to a dispatching instruction. The DTAG tail pointer points to the oldest uncompleted DTAG. The DTAG is allocated sequentially at dispatch time and de-allocated at completion time. The number of free DTAGs can be determined by examining the states of the DTAG head pointer and the DTAG tail pointer.

At dispatch time, the head/tail pointer logic (not shown) can determine how many DTAGs are available to assign to dispatching instructions. If all DTAGs are already allocated to instructions, then the dispatch logic must stop and wait for DTAGs to become available. If there are available DTAGs to be allocated, then the dispatch logic allocates a DTAG to the dispatching instruction. The newly allocated DTAGs can be obtained from the DTAG head pointer plus N, where 0-N represent the available DTAGs. After allocating the DTAGs to dispatching instructions, the DTAG head pointer is advanced to the next free DTAG.

At flush time, the DTAG head pointer must move back to the oldest un-flushed DTAG plus one position. In other words, the DTAG head pointer must move back to the next free DTAG to be allocated. At flush time, a flush_DTAG (any DTAG equal or younger than the flush_DTAG will be flushed out) is sent to the head/tail pointer management logic. The flush_DTAG then replaces the current DTAG head pointer as the new DTAG head pointer.

At completion time, the DTAG tail pointer must move forward to de-allocate completing DTAGs. At completion time, the count of completing DTAGs is sent to the head/tail management logic. The DTAG tail pointer logic will move forward (de-allocating) based on the count of completing DTAGs. For example, if four DTAGs were to be completed, then the DTAG tail pointer would move forward four slots to de-allocate these four DTAGs.

Figure 5A:
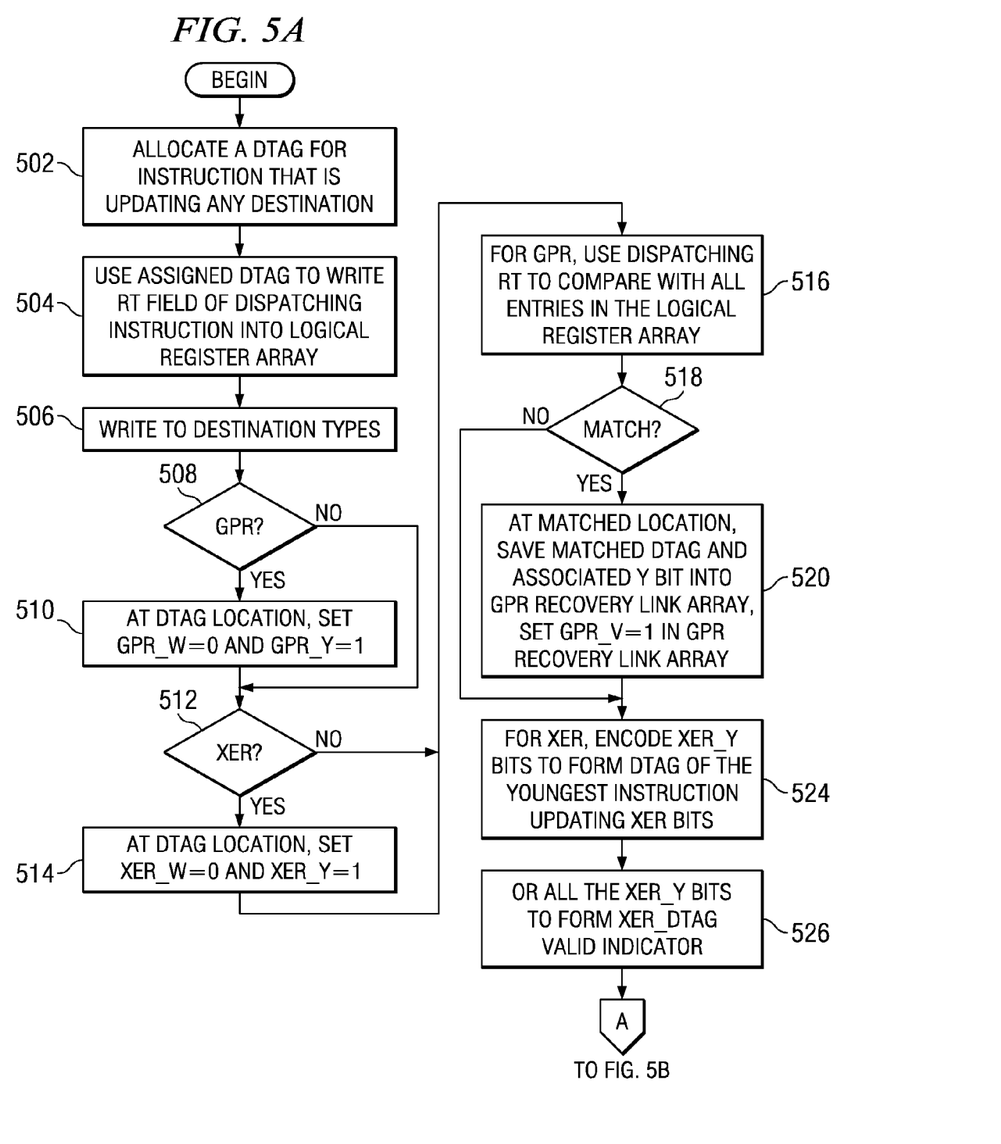
FIGS. 5A and 5B are flowcharts illustrating the operation of a microprocessor with a universal rename mechanism at dispatch time in accordance with an illustrative embodiment.
Figure 5B:
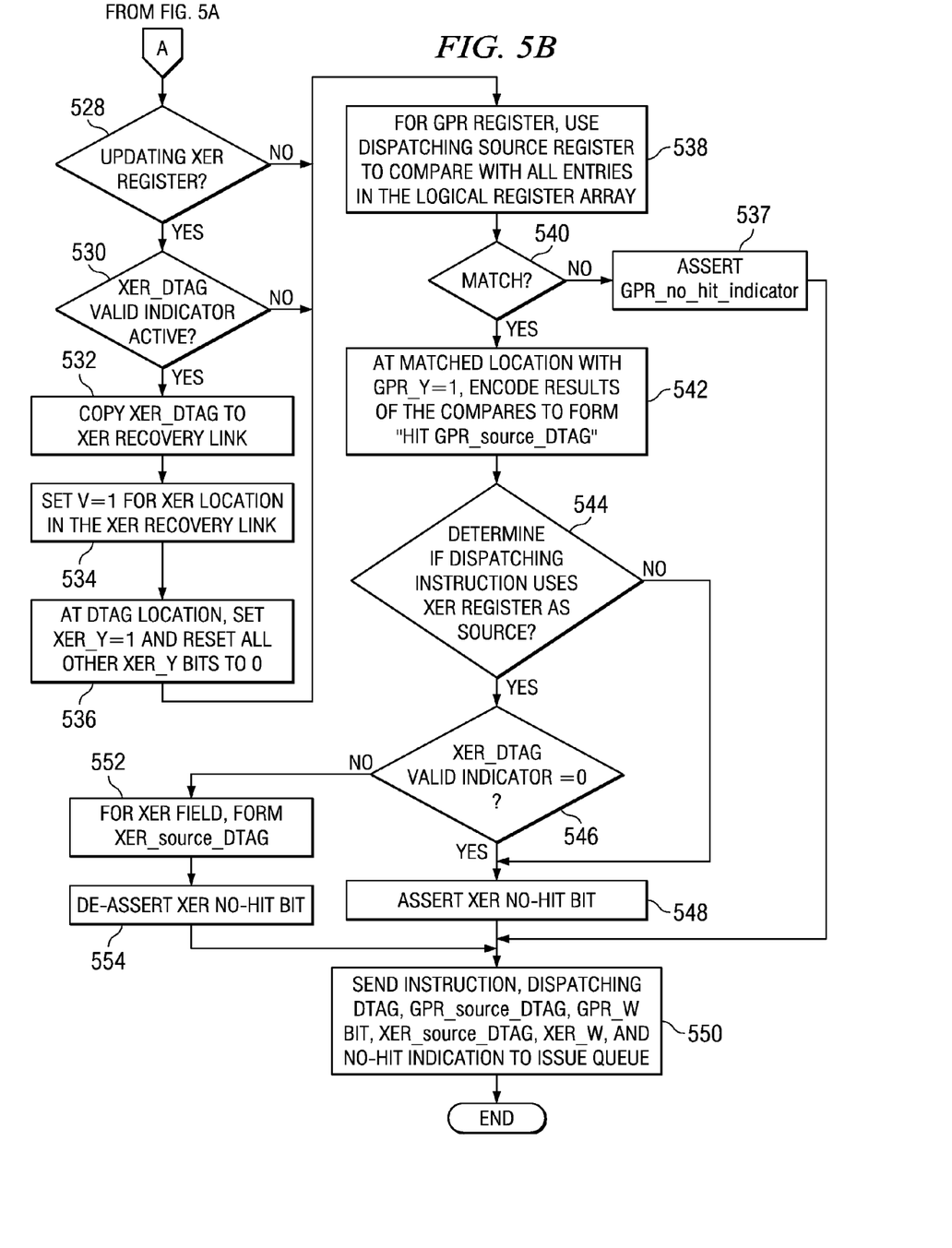

FIGS. 5A and 5B are flowcharts illustrating the operation of a microprocessor with a universal rename mechanism at dispatch time for an instruction in accordance with an illustrative embodiment. It will be understood that blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

With reference now to FIG. 5A, operation begins and the microprocessor allocates a destination tag (DTAG) for the instruction that is updating any destination (step 502). For a FXU instruction that is updating multiple destinations, such as GPR and XER, only one DTAG is needed per instruction in the illustrative embodiment. The microprocessor uses the assigned DTAG to write the destination register, or register target (RT), field of the dispatching instruction into the logical register array (block 504). At the same location, the microprocessor writes to the destination types for the instruction (block 506). For example, if the instruction updates the GPR register, then the microprocessor sets the GPR destination bit to 1, and if the instruction updates the XER register, the microprocessor sets the XER destination bit to 1. If a FXU instruction updates both the GPR and XER, for instance, the microprocessor sets both destination types to 1.

The microprocessor determines whether the instruction updates the GPR register (block 508). If the instruction updates the GPR register, then the microprocessor sets GPR_W=0 and GPR_Y=1 at the DTAG location (block 510). Setting GPR_W=0 indicates that the result is not yet written into the GPR rename buffer. Setting GPR_Y=1 indicates that the instruction is the youngest instruction updating the particular RT location. Thereafter, or if the instruction does not update the GPR register in block 508, the microprocessor determines whether the instruction updates the XER register (block 512). If the instruction updates the XER register, then the microprocessor sets XER_W=0 and XER_Y=1 at the DTAG location (block 514). Setting XER_W=0 indicates that the result is not yet written into the XER rename buffer. Setting XER_Y=1 indicates that the instruction is the youngest instruction updating the particular RT location.

Thereafter, or if the instruction does not update the XER register in block 512, for GPR, the microprocessor uses the dispatching RT to compare all entries in the logical register array (block 516). The microprocessor determines whether there is a matching RT (block 518). If there is a matching destination, then at the matched location, the microprocessor saves the matched DTAG and its associated Y bit into the GPR recovery link array at the location pointed to by the dispatching DTAG (block 520). Also, in block 520, the microprocessor sets GPR_V=1 at this location in the GPR recovery link array to indicate that the DTAG saved in this location is still in the rename state. Thus, the newly dispatching DTAG will carry with it a link to the previous DTAG that is updating the same RT location.

Thereafter, or if there is not a match in block 518, the microprocessor encodes XER_Y bits to form the DTAG of the youngest instruction updating the XER bits (block 524). The microprocessor ORs together all the XER_Y bits to form a XER_DTAG valid indicator (block 526). The microprocessor determines whether the dispatching instruction updates the XER register (block 528 in FIG. 5B). If the dispatching instruction updates the XER register, the microprocessor determines whether the XER_DTAG valid indicator is active (block 530). If the XER_DTAG valid indicator is active, the microprocessor copies the XER_DTAG formed as described previously to the XER recovery link (block 532). Then, the microprocessor sets the valid bit to 1 for this XER location in the XER recovery link array (block 534). Also, at the DTAG location, the microprocessor sets XER_Y=1 and resets all other XER_Y bits to 0 (block 536). There should be only one location with XER_Y=1 in the XER_Y bits vector.

If the dispatching instruction does not update the XER register in block 528 or if the XER_DTAG valid indicator is not active in block 530, then for the GPR register, the microprocessor uses the dispatching source register (RA, RB) to compare with all entries in the logical register array (block 538). The microprocessor determines whether a match exists (block 540). If there is no match in block 540, then the GPR_no_hit indicator is asserted (block 537) and operation proceeds to block 550 to be described below. If there is a match, at the matched location with GPR_Y=1, the microprocessor encodes the results of the compares to form a "hit GPR_source_DTAG" (block 542). The GPR_source_DTAG is the DTAG of the older instruction on which the RA/RB depend. There should be only one matched compare per RA or RB, because there is only one RT field with GPR_Y=1. The rest of the compares will not match. Thus, for RA or RB, the compares will result in a "hot 1" field that can be encoded to form the "GPR_source_DTAG."

Thereafter, the microprocessor determines if the dispatching instruction uses the XER register as a source (block 544). If the dispatching instruction is not using the XER as a source register, then the XER no-hit bit is asserted (block 548). If the dispatching instruction is using the XER as a source register, the microprocessor determines whether the XER_DTAG valid indicator is de-asserted (0)(block 546). If the XER_DTAG valid indicator is de-asserted (0), then the microprocessor asserts the XER no-hit bit to indicate that this particular RA or RB is not dependent on an older instruction for its operand(s)(block 548). In effect, if the XER valid indicator is a 1, and the dispatching instruction is using the XER as a source register, then the XER_no_hit indicator will be de-asserted. If the XER valid indicator is a 0, and the dispatching instruction is using the XER as a source register, than the no-hit indicator will be asserted. If the dispatching instruction is not using XER as a source register, the XER no-hit indicator also will be asserted. Thereafter, the microprocessor sends the instruction, dispatching DTAG, GPR_source_DTAG, GPR_W bit, XER_source_DTAG, XER_W, and no-hit indications to the issue queue (block 550). Then, operation ends.

If the XER_DTAG valid indicator is not zero in block 546, meaning the XER_DTAG valid indicator is asserted, then the microprocessor uses the XER_DTAG forms from block 524 in FIG. 5A as the XER_source_DTAG (block 552) and de-asserts the XER no-hit bit (block 554). This is done differently than the GPR since there is only one XER architected register in the microprocessor, and an active XER Y-bit indicates which DTAG the older instruction that is updating the XER register is assigned to. Thereafter, the microprocessor sends the instruction, dispatching DTAG, GPR_source_DTAG, GPR_W bit, XER_source_DTAG, XER_W, and no-hit indications to the issue queue (block 550). Then, operation ends.

Figure 6A:
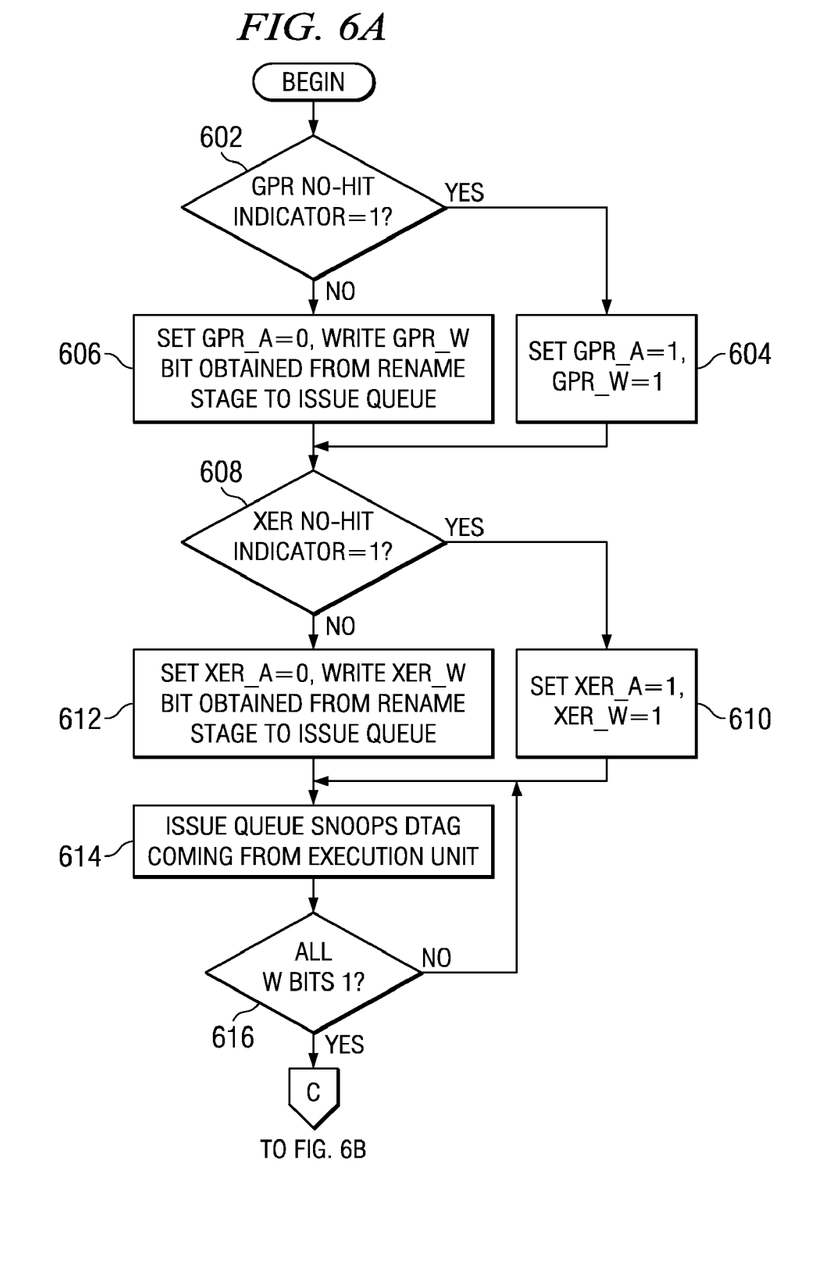
FIGS. 6A and 6B are flowcharts illustrating operation of the issue queue of a microprocessor with a universal rename buffer in accordance with an illustrative embodiment.
Figure 6B:
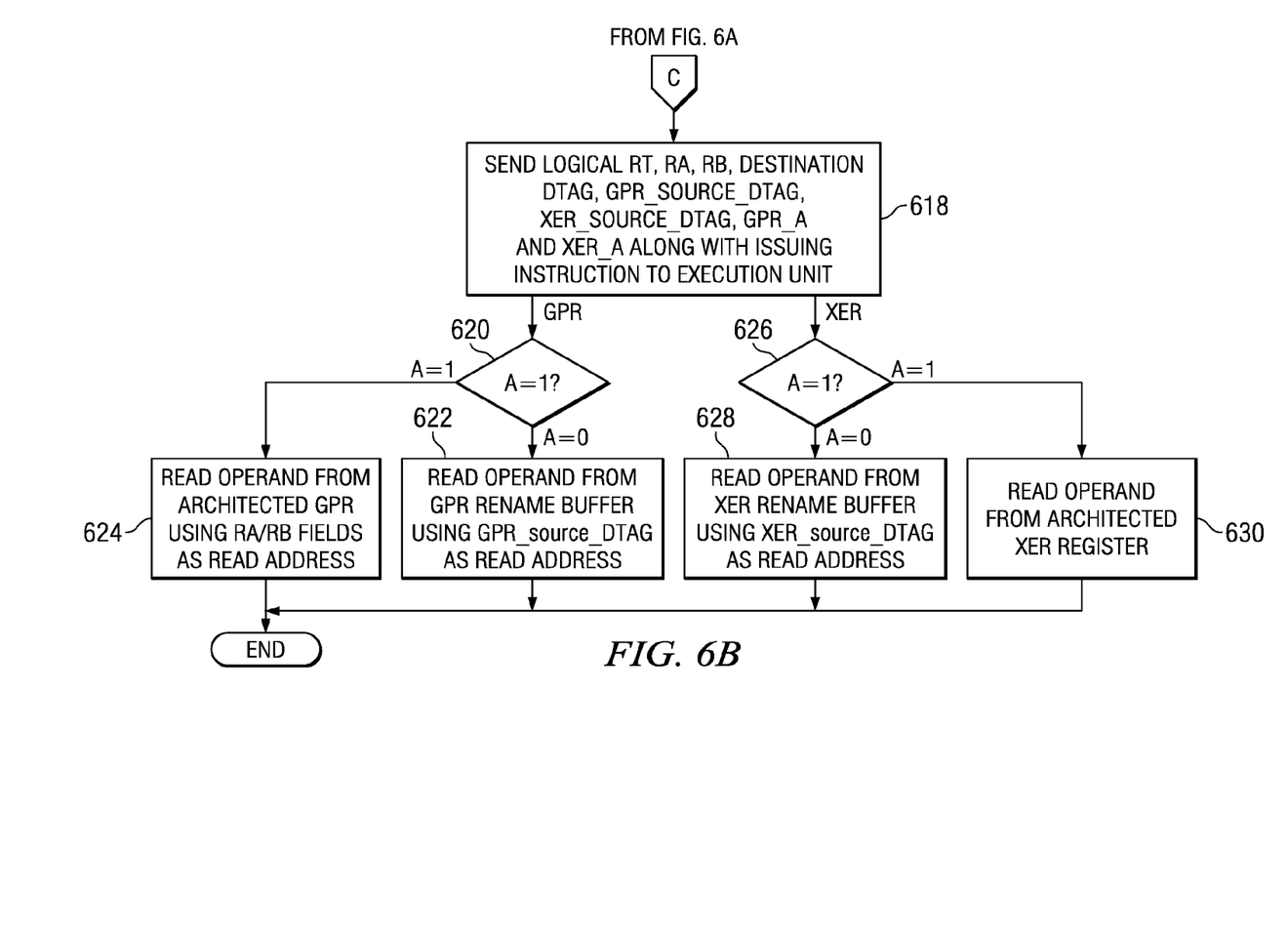

FIGS. 6A and 6B are flowcharts illustrating operation of the issue queue of a microprocessor with a universal rename buffer in accordance with an illustrative embodiment. With reference to FIG. 6A, operation begins, and the issue queue logic determines whether the GPR no-hit indicator coming from the rename stage is a 1 (block 602). If the no-hit indicator is a 1, then the issue queue logic sets the GPR_A bit and the GPR_W bit in the issue queue to 1 (block 604). This indicates that the instruction is ready to be issued because it does not depend on any older instruction, and the operand can be obtained from the architected register. If the no-hit indicator is 0 in block 602, the issue queue logic sets GPR_A=0 and writes the GPR_W bit obtained from the rename stage to the issue queue (block 606).

After block 604 or block 606, the issue queue logic determines whether the XER no-hit indicator coming from the rename stage is a 1 (block 608). If the no-hit indicator is a 1, then the issue queue logic sets the XER_A bit and the XER_W bit in the issue queue to 1 (block 610). This indicates that the instruction is ready to be issued because it does not depend on any older instruction, and the operand can be obtained from the architected register. If the no-hit indicator is 0 in block 608, the issue queue logic sets XER_A=0 and writes the XER_W bit obtained from the rename stage to the issue queue (block 612).

After block 610 or block 612, the issue queue snoops the DTAG coming from the execution units (block 614). The microprocessor determines whether all W bits are 1 (block 616). The issue queue can only issue an instruction when all W bits are 1. If all W bits are not 1, then operation returns to block 614 to snoop DTAG coming from the execution unit. If all W bits are 1 in block 616, then at the issue stage, the issue logic sends the logical RT, RA, RB, destination DTAG (this will become GPR and XER execution_DTAG at finish time), GPR_source_DTAG, and XER_source_DTAG, GPR_A, and XER_A, along with the issuing instruction, to the appropriate execution unit (block 618 in FIG. 6B).

For the GPR, the microprocessor determines whether GPR_A is 1 (block 620). If GPR_A=0 in block 620, the microprocessor reads the operand from the GPR rename buffer using the GPR_source_DTAG as the read address (block 622). Thereafter, operation ends. If GPR_A=1 in block 620, the microprocessor reads the operand from the architected GPR using the RA/RB fields as the read address (block 624). Thereafter, operation ends.

For the XER, the microprocessor determines whether XER_A is 1 (block 626). If XER_A=0 in block 626, the microprocessor reads the operand from the XER rename buffer using the XER_source_DTAG as the read address (block 628). Thereafter, operation ends. If XER_A=1 in block 626, the microprocessor reads the operand from the architected XER register (block 630). Thereafter, operation ends.

Figure 7A:
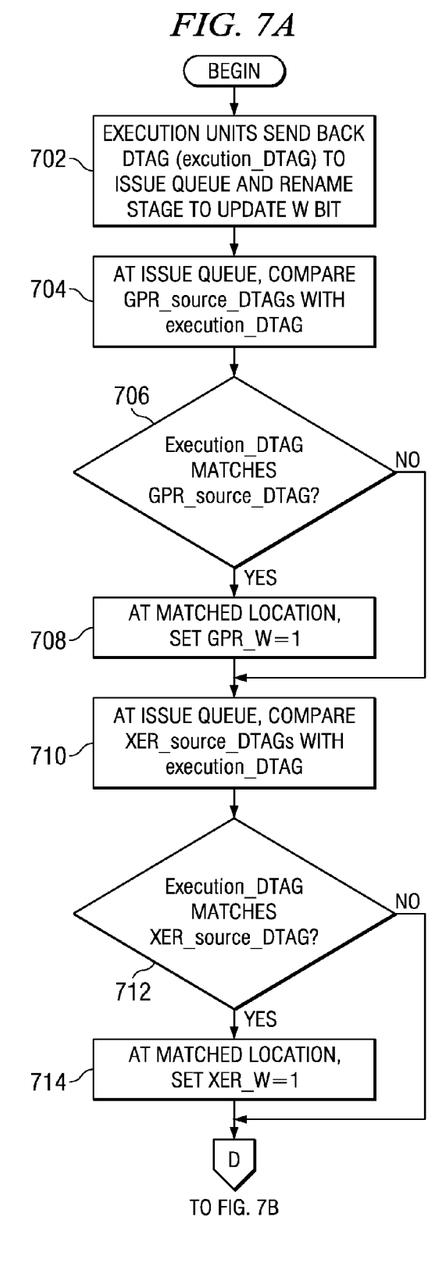
FIGS. 7A and 7B are flowcharts illustrating operation of a microprocessor with a universal rename mechanism at execution/write back time in accordance with an illustrative embodiment.
Figure 7B:
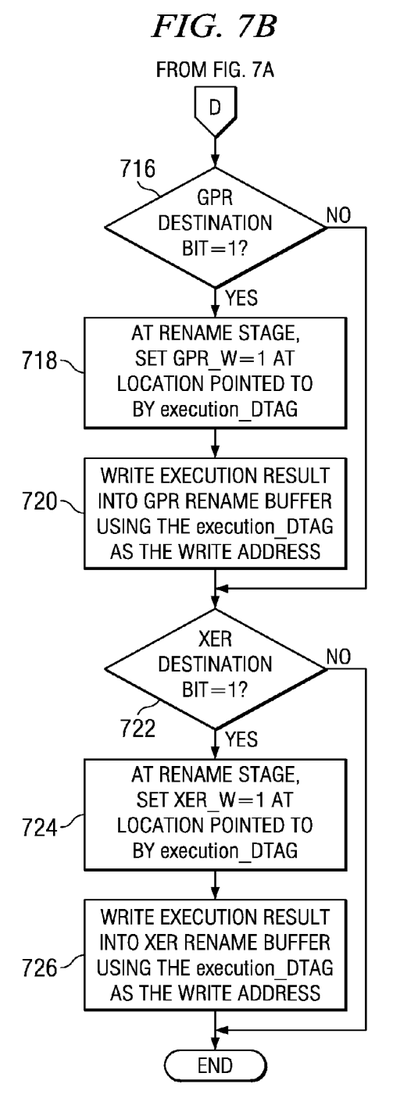

FIGS. 7A and 7B are flowcharts illustrating operation of a microprocessor with a universal rename mechanism at execution/write back time in accordance with an illustrative embodiment. Operation begins at finish time, and the execution units send back the DTAG (execution_DTAG) to the issue queue and the rename stage to update the W bit (block 702). At the issue queue, the microprocessor compares the GPR_source_DTAGs with the execution_DTAG (block 704). The microprocessor determines whether the execution_DTAG matches the GPR_source_DTAG (block 706). If the execution_DTAG matches with the GPR_source_DTAG, then at the matched location, the microprocessor sets GPR_W=1 to indicate that the operand can now read data from the rename buffer (block 708).

Thereafter, or if the execution_DTAG does not match the GPR_source_DTAG in block 706, at the issue queue, the microprocessor compares the XER_source_DTAGs with the execution_DTAG (block 710). The microprocessor determines whether the execution_DTAG matches the XER_source_DTAG (block 712). If the execution_DTAG matches with the XER_source_DTAG, then at the matched location, the microprocessor sets XER_W=1 to indicate that the operand can now read data from the rename buffer (block 714).

Thereafter, or if the execution_DTAG does not match the XER_source_DTAG in block 712, the microprocessor determines whether the GPR destination bit is 1 (block 716 in FIG. 7B). If the GPR destination bit is 1, at the rename stage, the microprocessor sets GPR_W=1 at the location pointed to by the execution_DTAG (block 718). When GPR_W=1, any younger instruction that depends on the RT will have to read its operand from the rename buffer. Then, the microprocessor writes the execution result into the GPR rename buffer using the execution_DTAG as the write address (block 720).

Thereafter, or if the GPR destination bit is not 1 in block 716, the microprocessor determines whether the XER destination bit is 1 (block 722). If the XER destination bit is 1, at the rename stage, the microprocessor sets XER_W=1 at the location pointed to by the execution_DTAG (block 724). When XER_W=1, any younger instruction that depends on the XER will have to read its operand from the rename buffer. Then, the microprocessor writes the execution result into the XER rename buffer using the execution_DTAG as the write address (block 726). Thereafter, or if the XER destination bit is not 1 in block 722, operation ends.

Figure 8A:
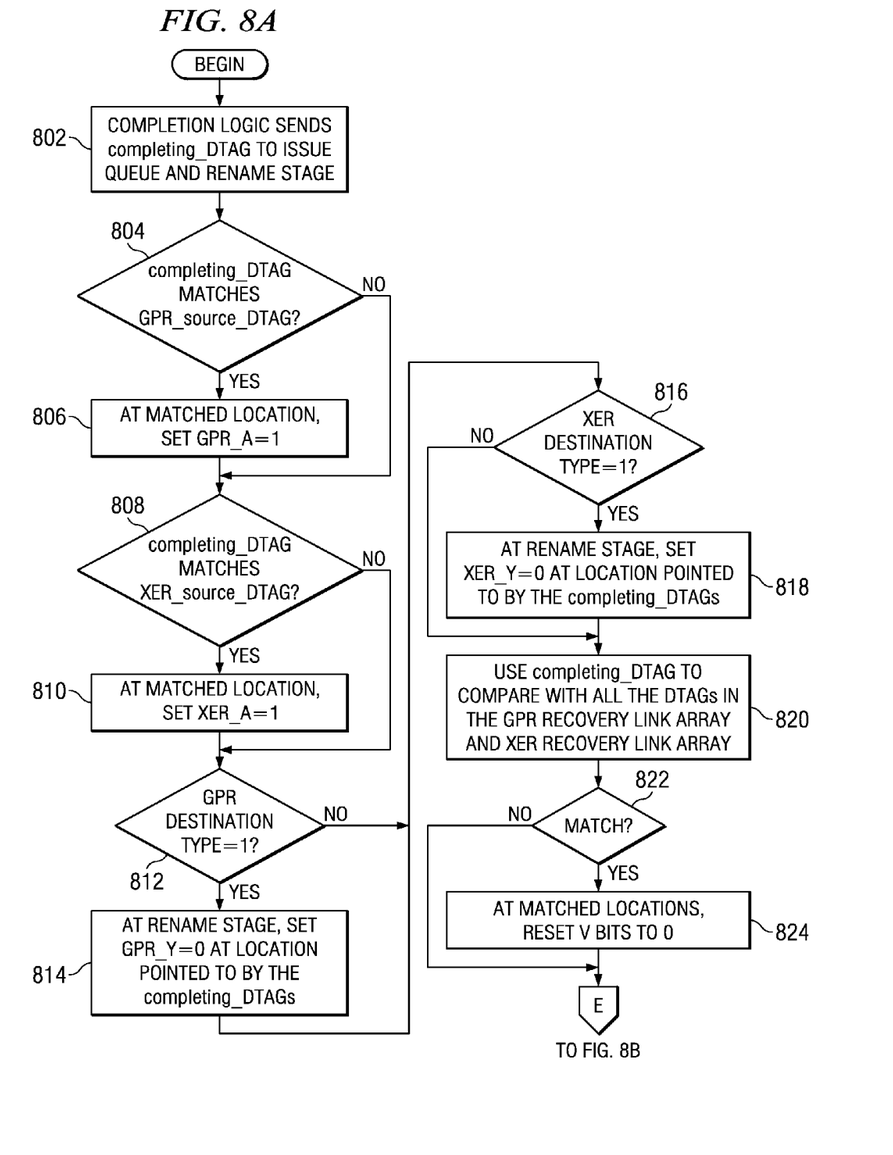
FIGS. 8A and 8B are flowcharts illustrating operation of a microprocessor with a universal rename mechanism at completion time in accordance with an illustrative embodiment.
Figure 8B:
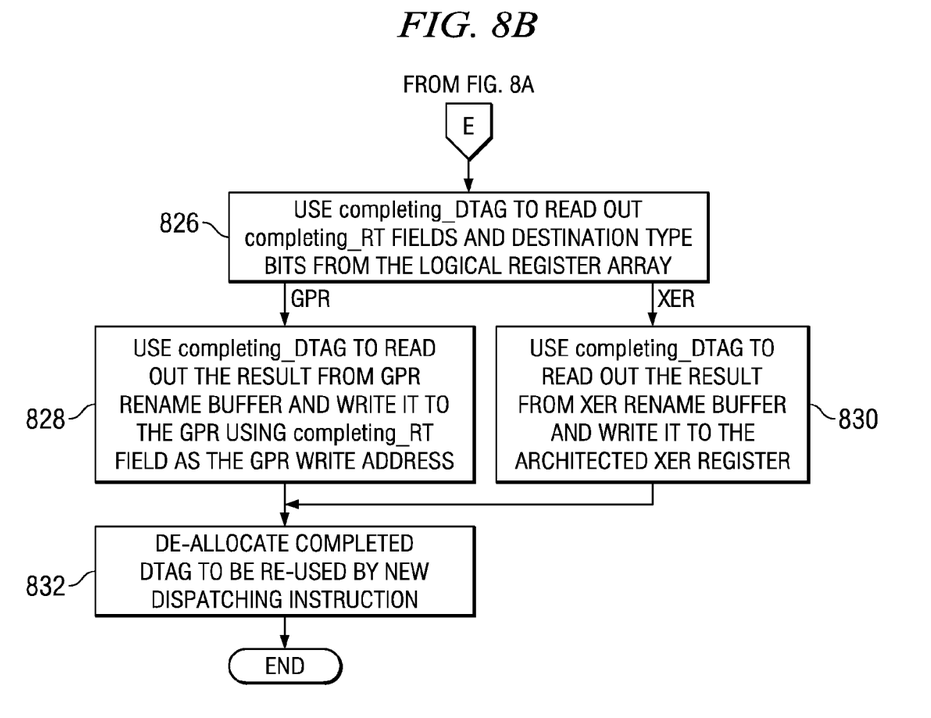

FIGS. 8A and 8B are flowcharts illustrating operation of a microprocessor with a universal rename mechanism at completion time in accordance with an illustrative embodiment. With reference to FIG. 8A, operation begins at completion time, and the completion logic sends the completing_DTAG to the issue queue and rename stage to update the W bit (block 802). At the issue queue, the microprocessor determines whether the completing_DTAG matches the GPR_source_DTAG (block 804). If the completing_DTAG matches with the GPR_source_DTAG, then at the matched location, the microprocessor sets GPR_A=1 to indicate that the operand can now be read from the architected register (block 806).

Thereafter, or if the completing_DTAG does not match the GPR_source_DTAG in block 804, the microprocessor determines whether the completing_DTAG matches the XER_source_DTAG (block 808). If the completing_DTAG matches with the XER_source_DTAG, then at the matched location, the microprocessor sets XER_A=1 to indicate that the operand can now be read from the architected register (block 810).

Thereafter, or if the completing_DTAG does not match the XER_source_DTAG in block 808, the microprocessor determines whether the GPR destination bit is 1 (block 812). If the GPR destination bit is 1, at the rename stage, the microprocessor sets GPR_Y=0 at the location pointed to by the completing_DTAGs (block 814).

Thereafter, or if the GPR destination bit is not 1 in block 812, the microprocessor determines whether the XER destination bit is 1 (block 816). If the XER destination bit is 1, at the rename stage, the microprocessor sets XER_Y=0 at the location pointed to by the completing_DTAGs (block 818).

Thereafter, or if the XER destination bit is not 1 in block 816, the microprocessor uses the completing_DTAGs to compare with all the DTAGs in the GPR recovery link array and the XER recovery link array (block 820). The microprocessor determines whether the any of the completing_DTAGs match any DTAGs in the recovery link arrays (block 822). If there are any matches, at the matched locations, the microprocessor resets the V bits to 0 to indicate that these locations are completed (block 824). Thereafter, or if there are no matches in block 822, operation proceeds to block 826 in FIG. 8B, where the microprocessor uses the completing_DTAG to read out the completing_RT fields and the destination type bits from the logical register array.

If the GPR destination type is 1, then the microprocessor uses the completing_DTAG to read out the result from the GPR rename buffer and write the result to the GPR (block 828). The microprocessor uses the completing_RT field as the GPR write address. If the XER destination type is 1, then the microprocessor uses the completing_DTAG to read out the result from the XER rename buffer and write the result to the XER (block 830). The microprocessor uses the completing_RT field as the XER write address. The microprocessor may perform both block 828 and block 830 if the instruction targets both GPR and XER destinations. After writing the result to the architected register in block 828 and/or block 830, the microprocessor de-allocates the completed DTAG to be re-used by a new dispatching instruction (block 832). Thereafter, operation ends.

Figure 9:
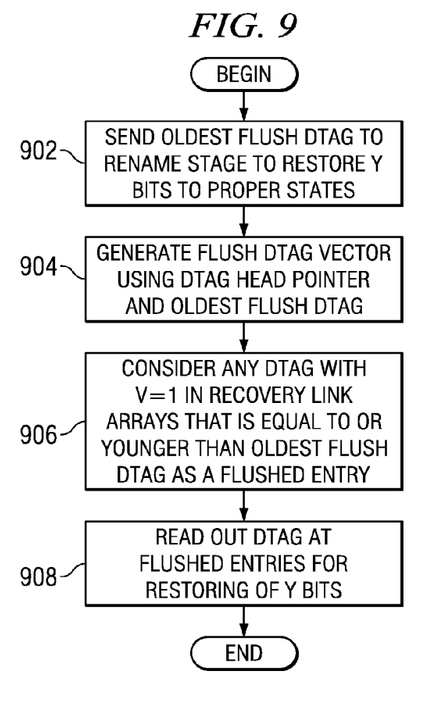
FIG. 9 is a flowchart illustrating operation of a microprocessor with a universal rename mechanism at flush time in accordance with an illustrative embodiment.

FIG. 9 is a flowchart illustrating operation of a microprocessor with a universal rename mechanism at flush time in accordance with an illustrative embodiment. Operation begins, and the completion logic sends an oldest flush DTAG to the rename stage to restore the Y bits to the proper states (block 902). Next, microprocessor generates a flush DTAG vector using the DTAG head pointer and the oldest flush DTAG coming from the completion logic (block 904). The flush DTAG vector is used to flush any DTAG that is equal to or younger than the oldest flush DTAG.

Then, the microprocessor considers any DTAG with V=1 in the recovery link array that is equal to or younger than the oldest flush DTAG as a flushed entry (block 906). In other words, any entries between the DTAG head pointer and the oldest flush DTAG, including the oldest flush DTAG, are flushed out. The microprocessor reads out the DTAG at the flushed entries for restoring the Y bits (block 908). These DTAGs are called restore_DTAGs. DTAGs from all flushed entries must be read out and restored prior to dispatching of the new instruction stream. Thereafter, operation ends.

Figure 10:
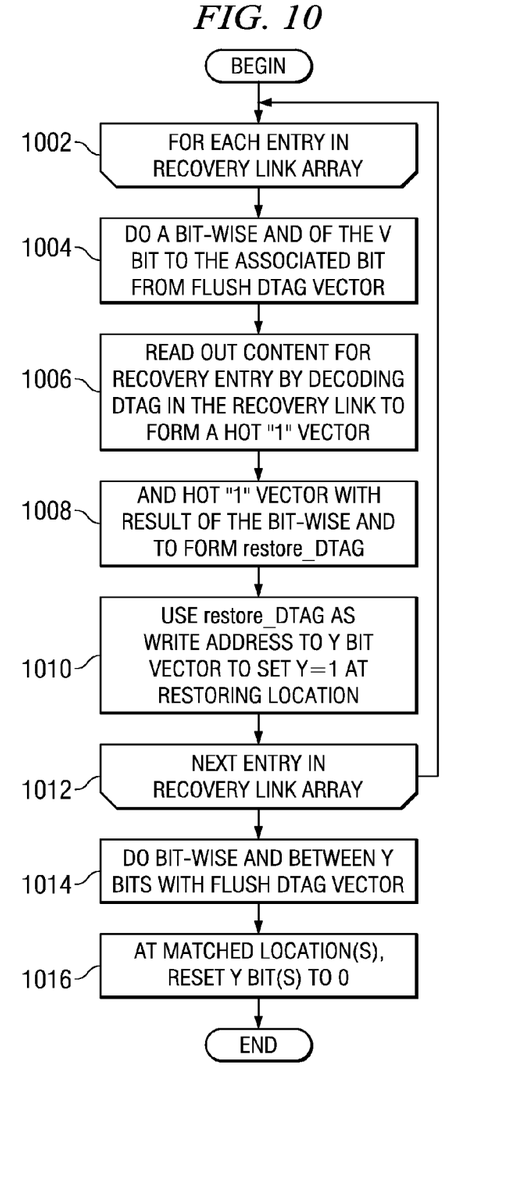
FIG. 10 is a flowchart illustrating operation of a restoring function in accordance with an illustrative embodiment.

FIG. 10 is a flowchart illustrating operation of a restoring function in accordance with an illustrative embodiment. Operation begins, and for each entry in the recovery link array (block 1002), the microprocessor does a bit-wise AND of the V bit to the associated bit from the flush DTAG vector to indicate that this entry is being flushed and the content should be read out (block 1004). Then, the microprocessor reads out the content for the recovery entry by decoding the DTAG in the recovery link to form a hot "1" vector (block 1006). Next, the microprocessor ANDs the hot "1" vector with the result of the bit-wise AND formed from block 1004 (block 1008). This forms the restore_DTAG for each entry. The microprocessor uses the restore_DTAG as a write address to the Y bit vector to set the Y=1 at the restoring location (block 1010). Then, the microprocessor considers the next entry in the recovery link array (block 1012), and operation returns to block 1002 until all entries of the recovery link array are considered.

After all Y bits are restored, then the microprocessor does a bit-wise AND between the Y bits in the newly restored Y bit vector with the flush DTAG vector to clear out any Y bits of the flushed instructions that got restored from blocks 1004 to 1010 (block 1014). At the matched location(s), the microprocessor resets the Y bit(s) to 0 (block 1016). This prevents multiple Y bits to be set to 1 for the same logical RT register. In other words, if the restore_DTAG is pointing to a flushed entry, then the Y bit for that entry must be reset to 0 instead of setting to a 1. Thereafter, operation ends. The restoring function shown in FIG. 10 ensures that newly dispatched instructions after the flush will know on which RT is the youngest to depend.

Thus, the illustrative embodiments solve the deficiencies of the prior art by providing a unified register rename mechanism for instructions with multiple targets using a common destination tag (DTAG). For each instruction that updates multiple destinations, a single rename entry is allocated to handle all destinations associated with it. A rename entry now consists of a DTAG and a vector to indicate the type of destination(s) that is/are being updated by such a particular instruction. For example, a common DTAG can be assigned to a fixed point unit (FXU) instruction that updates general purpose register (GPR), fixed point exception register (XER), and condition code register (CR) destinations. In other words, one DTAG may be assigned to all three types of destinations. During flush time, the DTAGs in the recovery link may be used to restore the information indicating that the youngest instruction updates a particular architected register. By using a single, universal rename structure for all types of destinations, a large saving in silicon and power can be realized without the need to sacrifice performance.

It should be appreciated that the illustrative embodiments may take the form of an entirely hardware embodiment, an entirely software embodiment, or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for universal register renaming, the method comprising:
   allocating a destination tag for an instruction being issued in a microprocessor;
   setting a first destination type and a second destination type for the instruction in a logical register array in the microprocessor;
   asserting a first rename buffer bit if a result of the instruction is written to a rename buffer corresponding to the first destination type;
   asserting a second rename buffer bit if a result of the instruction is written to a rename buffer corresponding to the second destination type;
   in an issue queue, determining whether an issuing instruction depends on a younger instruction;
   if the issuing instruction does not depend on a younger instruction, asserting a first architected register bit corresponding to the first destination type or a second architected register bit corresponding to the first destination type in the issue queue for the issuing instruction;
   if the issuing instruction depends on a younger instruction, de-asserting the first architected register bit or the second architected register bit in the issue queue for the issuing instruction;
   for an issuing instruction with the first rename buffer bit asserted or the second rename buffer bit asserted, sending a logical register target, one or more dispatching source register addresses, a dispatching destination tag, a first source destination tag corresponding to the first destination type, a first rename buffer bit corresponding to the first destination type, a second source destination tag corresponding to the second destination type, and a second rename buffer bit corresponding to the second destination type for the issuing instruction to a corresponding execution unit;
   writing a result of execution into a rename buffer corresponding to the first destination type or a rename buffer corresponding to the second destination type of the executing instruction using the execution destination tag as a write address;
   at completion time, sending completing destination tag for a completing instruction to the issue queue and the rename stage;
   using the completing destination tag to read out completing register target fields and destination type bits from the logical register array;
   using the completing destination tag to read out a result from a rename buffer corresponding to the first destination type or a rename buffer corresponding to the second destination type of the completing instruction; and
   writing the result to an architected register corresponding to the first destination type or an architected register corresponding to the second destination type of the completing instruction.

2. The method of claim 1, further comprising:
   determining whether the instruction accesses a target register that matches a target register of a previous instruction; and
   if the instruction accesses a target register that matches a target register of a previous instruction, writing a destination tag for the previous instruction in a recovery link entry in a recovery link array.

3. The method of claim 2, further comprising:
   maintaining validity of entries in the recovery link array.

4. The method of claim 2, further comprising:
   asserting a youngest instruction bit for the instruction to indicate that the instruction is the youngest instruction that accesses the target register.

5. The method of claim 1, further comprising:
   if the first architected register bit for the issuing instruction is asserted, reading one or more operands from an architected register corresponding to the first destination type of the issuing instruction using the one or more dispatching source register addresses as read addresses; and
   if the second architected register bit for the issuing instruction is asserted, reading one or more operands from an architected register corresponding to the second destination type of the issuing instruction.

6. A microprocessor with universal register renaming, the microprocessor comprising:
   an issue queue;
   a rename mechanism;
   a plurality of execution units; and
   completion logic,
   wherein the issue queue issues instructions to the plurality of execution units;
   wherein the plurality of execution units send information for executing instructions to the issue queue and the rename mechanism;
   wherein the completion logic sends information for completed instructions to the issue queue and the rename mechanism;
   wherein the rename mechanism allocates a destination tag for an instruction being issued in a microprocessor, sets a first destination type and a second destination type for the instruction in a logical register array in the microprocessor, asserts a first rename buffer bit if a result of the instruction is written to a rename buffer corresponding to the first destination type, and asserts a second rename buffer bit if a result of the instruction is written to a rename buffer corresponding to the second destination type;
   wherein the issue queue determines whether an issuing instruction depends on a younger instruction;

wherein if the issuing instruction does not depend on a younger instruction, the issue queue asserts a first architected register bit corresponding to the first destination type or a second architected register bit corresponding to the first destination type in the issue queue for the issuing instruction;

wherein if the issuing instruction depends on a younger instruction, the issue queue de-asserts the first architected register bit or the second architected register bit in the issue queue for the issuing instruction;

wherein for an issuing instruction with the first rename buffer bit asserted or the second rename buffer bit asserted, the issue queue sends a logical register target, one or more dispatching source register addresses, a dispatching destination tag, a first source destination tag corresponding to the first destination type, a first rename buffer bit corresponding to the first destination type, a second source destination tag corresponding to the second destination type, and a second rename buffer bit corresponding to the second destination type for the issuing instruction to a corresponding execution unit;

wherein the execution unit writes a result of execution into a rename buffer corresponding to the first destination type or a rename buffer corresponding to the second destination type of the executing instruction using the execution destination tag as a write address;

wherein at completion time, the completion logic sends a completing destination tag for a completing instruction to the issue queue and the rename mechanism;

wherein the rename mechanism uses the completing destination tag to read out completing register target fields, the first rename buffer bit, and the second rename buffer bit from the logical register array, uses the completing destination tag to read out a result from a rename buffer corresponding to the first destination type or a rename buffer corresponding to the second destination type of the completing instruction, and writes the result to an architected register corresponding to the first destination type or an architected register corresponding to the second destination type of the completing instruction.

7. The microprocessor of claim 6, wherein the rename mechanism determines whether the instruction accesses a target register that matches a target register of a previous instruction and if the instruction accesses a target register that matches a target register of a previous instruction, writes a destination tag for the previous instruction in a recovery link entry in a recovery link array.

8. The microprocessor of claim 7, wherein the rename mechanism maintains validity of entries in the recovery link array.

9. The microprocessor of claim 7, wherein the rename mechanism asserts a youngest instruction bit for the instruction to indicate that the instruction is the youngest instruction that accesses the target register.

10. The microprocessor of claim 6, wherein if the first architected register bit for the issuing instruction is asserted, the execution unit reads one or more operands from an architected register corresponding to the first destination type of the issuing instruction using the one or more dispatching source register addresses as read addresses; and wherein if the second architected register bit for the issuing instruction is asserted, the execution unit reads one or more operands from an architected register corresponding to the second destination type of the issuing instruction.

* * * * *